(12) United States Patent
Sholtis et al.

(10) Patent No.: US 8,490,068 B1
(45) Date of Patent: Jul. 16, 2013

(54) METHOD AND SYSTEM FOR FEATURE MIGRATION

(75) Inventors: Steven A. Sholtis, El Dorado Hills, CA (US); Kenneth J. Henderson, Folsom, CA (US); Terry F. LeClair, Fremont, CA (US); Joseph W. Wells, III, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 1683 days.

(21) Appl. No.: 11/698,524

(22) Filed: Jan. 26, 2007

(51) Int. Cl.
*G06F 9/44* (2006.01)

(52) U.S. Cl.
USPC .......................... 717/136; 717/101; 717/137

(58) Field of Classification Search
USPC .................................................. 717/101, 136
See application file for complete search history.

(56) References Cited

U.S. PATENT DOCUMENTS

| | | | | | |
|---|---|---|---|---|---|
| 4,734,854 | A | * | 3/1988 | Afshar | 717/107 |
| 5,123,103 | A | * | 6/1992 | Ohtaki et al. | 1/1 |
| 6,334,215 | B1 | * | 12/2001 | Barker et al. | 717/167 |
| 6,964,044 | B1 | * | 11/2005 | Hudson et al. | 717/177 |
| 7,080,159 | B2 | * | 7/2006 | Chu et al. | 709/246 |
| 7,117,486 | B2 | * | 10/2006 | Wong et al. | 717/141 |
| 7,149,734 | B2 | * | 12/2006 | Carlson et al. | 1/1 |
| 7,454,660 | B1 | * | 11/2008 | Kolb et al. | 714/38 |
| 7,707,007 | B2 | * | 4/2010 | Campbell | 702/182 |
| 8,051,410 | B2 | * | 11/2011 | Marfatia et al. | 717/137 |
| 2002/0087962 | A1 | * | 7/2002 | Hudson et al. | 717/172 |
| 2002/0178233 | A1 | * | 11/2002 | Mastrianni et al. | 709/217 |
| 2003/0074386 | A1 | * | 4/2003 | Schmidt et al. | 709/1 |
| 2003/0188036 | A1 | * | 10/2003 | Chen et al. | 709/310 |
| 2003/0225927 | A1 | * | 12/2003 | Goodman et al. | 709/320 |
| 2004/0068715 | A1 | * | 4/2004 | Wong et al. | 717/136 |
| 2004/0158820 | A1 | * | 8/2004 | Moore et al. | 717/136 |
| 2005/0010919 | A1 | * | 1/2005 | Ramanathan et al. | 717/174 |
| 2005/0125522 | A1 | * | 6/2005 | DelGaudio et al. | 709/223 |
| 2005/0160399 | A1 | * | 7/2005 | Kumar et al. | 717/104 |
| 2006/0200645 | A1 | * | 9/2006 | Kumar | 712/1 |
| 2007/0240143 | A1 | * | 10/2007 | Guminy et al. | 717/168 |
| 2007/0256058 | A1 | * | 11/2007 | Marfatia et al. | 717/137 |

OTHER PUBLICATIONS

Object Management Group, "OMG's MetaObject Facility", http://www.omg.org/mof/, Jan. 1, 2007, 2 pages.
Object Management Group, "Executive Overview", http://www.omg.org/mda/executive_overview.htm, Jan. 1, 2007, 3 pages.
Miller, J., Mukerji, J., "Model Driven Architecture (MDA)", Jul. 9, 2001, 31 pages.
An ORMSC White Paper, "A Proposal for an MDA Foundtain Model", ORMSC, May 4, 2001, 7 pages.
Soley, R., "Model Driven Architecture", Object Management Group, Nov. 27, 2000, 12 pages.
Miller, J., Mukerji, J., "MDA Guide Version 1.0.1", Jun. 12, 2003, 62 pages.
Carnegie Software Engineering Institute, "About Software Product Lines", http://www.sei.cmu.edu/productlines/about_pl.html, Jan. 1, 2007, 2 pages.
Northrop, L., Jones, L., "Introduction to Software Product Line Adoption", Carnegie Mellon Software Engineering Institute, 2005, 107 pages.
Visual Studio 2005 Technical Articles, "Visual Studio 2005 Team System Modeling Strategy and FAQ", Microsoft Corporation, May 2005, 11 pages.

* cited by examiner

*Primary Examiner* — Wei Zhen
*Assistant Examiner* — Matthew Brophy
(74) *Attorney, Agent, or Firm* — Osha Liang LLP

(57) ABSTRACT

A method for feature migration that includes defining a feature specification of a feature in a first application, wherein the feature specification comprises a feature element in a first specification defining the first application, defining a profile specification of a second application, importing the feature specification of the feature into the profile specification, and generating code for the second application using the profile specification, wherein the feature is thereby incorporated in the second application.

9 Claims, 5 Drawing Sheets

METHOD AND SYSTEM FOR FEATURE MIGRATION

BACKGROUND

The development of a software application is typically a multi-step process. Initially, the requirements for the software are determined. For example, a client informs a software development company of the client's requirements for the software. The client may specify the security level, type of interface, and functionality that should be included in software application. If the software is intended for a particular audience (e.g., the general public, the highly technical scientific community, children, or another type of group), then the requirements may be specified using a market research on that audience to identify feature, interface, security, and/or functionality preferences.

Next, the software development company may create a variety of documents (i.e., documentation) to use in different aspects of the development of the software. For example, the documentation may include a description of the functionality provided by the application, description of how the application may be used, descriptions of the manner in which the application is implemented, etc. Using the documentation, the software application is created.

After the creation of the software application, the application is tested by the software development company and, in some cases, the targeted audience, or a portion thereof. Based on the results of the testing, the software application may be revised and retested before being released to the targeted audience in a final version.

Further, the software development company may continue to revise and release the software application. Specifically, users of the application may detect errors in the application or may have requests for modifications of the application. Thus, the software development company may continuously correct error(s) and improve the application according to the requests. Through the release of updates and new versions, the software application is provided to the target audience. Based on feedback regarding the software application, certain features included within the application are considered valuable or popular. Accordingly, these features may be useful to keep in future versions of the software application, add the feature to existing software without such features, and/or incorporating the feature into new software applications in the future.

SUMMARY

In general, in one aspect, the invention relates to a method for feature migration that includes defining a feature specification of a feature in a first application, wherein the feature specification comprises a feature element in a first specification defining the first application, defining a profile specification of a second application, importing the feature specification of the feature into the profile specification, and generating code for the second application using the profile specification, wherein the feature is thereby incorporated in the second application.

In general, in one aspect, the invention relates to a system for feature migration that includes a product development environment interface configured to define a feature specification of a feature in a first application, wherein the feature specification comprises a feature element in a first specification defining the first application, define a profile specification of a second application, and import the feature specification of the feature into the profile specification. Additionally, the system may include a code generator configured to generate code for the second application using the profile specification, wherein the feature is thereby incorporated in the second application.

In general, in one aspect, the invention relates to a computer program product that includes computer readable program code embodied therein for causing a computer system to define a feature specification of a feature in a first application, wherein the feature specification comprises a feature element in a first specification defining the first application, define a profile specification of a second application, and import the feature specification of the feature into the profile specification, wherein code is generated for the second application using the profile specification, wherein the feature is thereby incorporated in the second application.

Other aspects of the invention will be apparent from the following description and the appended claims.

DETAILED DESCRIPTION

Figure 1:
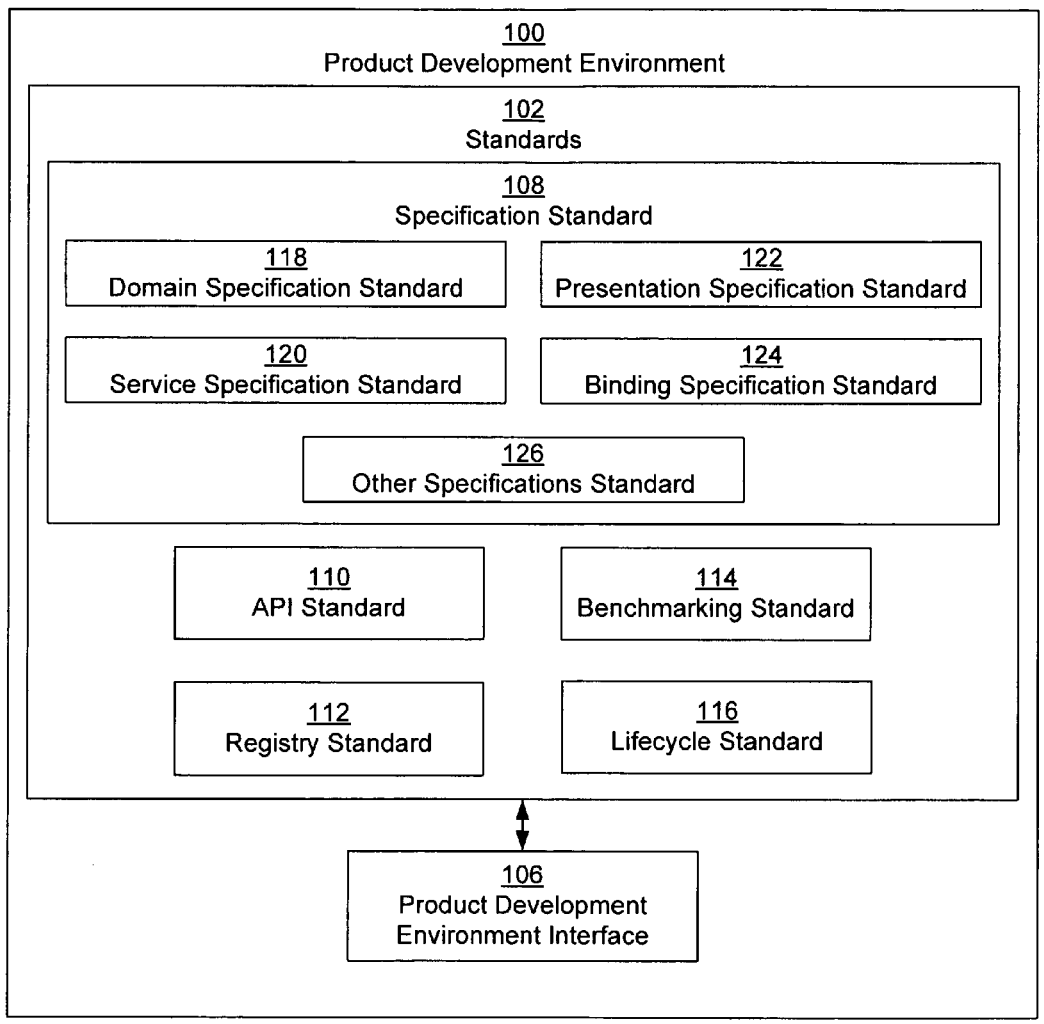
FIGS. 1-2 show a schematic diagram of a system for feature migration in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for feature migration. Specifically, embodiments of the invention provide a mechanism for copying a feature of one or more applications into another application or product line. A feature corresponds to a portion of an application or software product. For example, a feature may correspond to a backup mechanism for an application, an item in a menu, a graphical icon and/or functionality provided by using the graphical icon, etc. Migrating the feature may be performed by importing one or more portions of the feature(s) from specification(s) of a first application(s) into the specification of the second application to which the feature is migrated. After migrating the feature into the specification of the second application, code may be generated from the specification of the second application to add the feature to the application. By allowing for feature migration at the specification level of developing the application, features spanning multiple separate specifications (e.g., features that have user interface and business logic) may be easily imported into the application through a single migration. Thus, because the code may be generated from the specification, the integrity of the code may be easily maintained in accordance with one or more embodiments of the invention.

Figure 2:
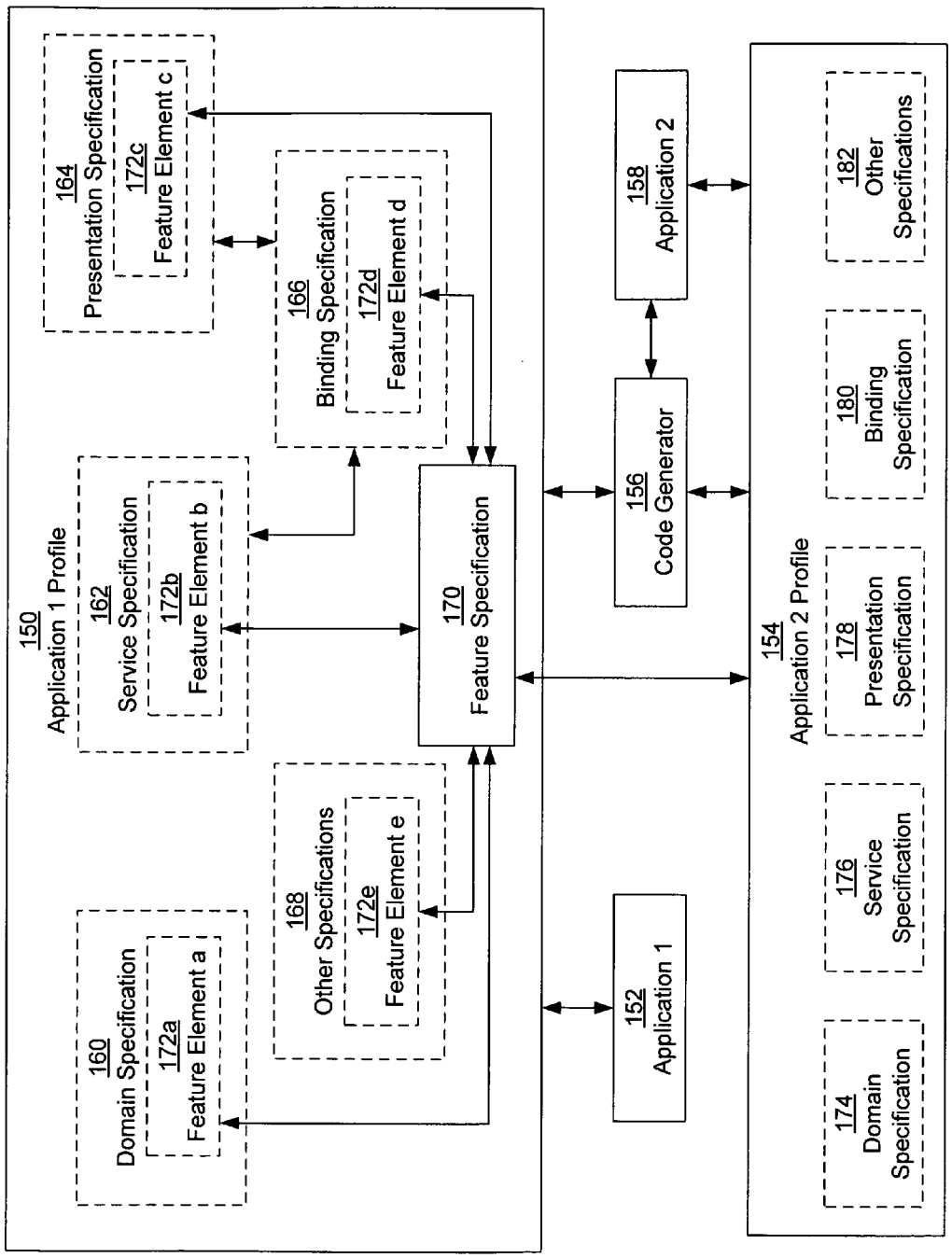

FIGS. 1-2 show a schematic diagram of a system for feature migration in accordance with one or more embodiments of the invention. Specifically, FIG. 1 shows a product development environment (100) in accordance with one or more embodiments of the invention. A product development environment (100) corresponds to a tool for assisting developers to manufacture one or more software products. The software products may correspond to the same product line, such as a product line with software products directed to finances, taxes, medical, home inventory, or other business segments or to different product lines, such as to finance and operating systems or other product lines. Further, software products may include one or more software applications from related or unrelated areas. For example, a software product may correspond to one or more of a firewall application, an anti-virus application, as well as other security-related application. Likewise, a software product may correspond to financial software that includes one or more of a personal financial application, a business financial application, a payroll application, a medical claim transaction application, as well as other applications. As shown in FIG. 1, the product development environment (100) may include standards (102) and a product development environment interface (104) in accordance with one or more embodiments of the invention. One or more embodiments of the standards (102) and the product development environment interface (104) are described below.

Standards (102) correspond to a set of requirements and processes by which a software product or product line may be developed. The standards (102) (defined by the product development environment) may include one or more of a specification standard (108), an application programming interface (API) standard (110), a registry standard (112), a benchmarking standard (114), a lifecycle standard (116), and other standards as may be appropriate to the software product.

The specification standard (108) may define the creation and use of applications. Specifically, the specification standard (108) may define a manner to describe various aspects of the creation of a software product through the use of specifications.

In one or more embodiments of the invention, specifications of an application are defined using a language such as extensible markup language (XML). Specifically, the specification standards may correspond to XML schemas, while the specifications for an application may correspond to XML document. Using an XML tag, components of a specification may be delineated in an XML document. The XML tags may be user-defined or defined by the specification.

Further, in one or more embodiments of the invention, components of a specification, as well as the specification, may have an identifier. In one or more embodiments of the invention, the identifier includes the type of component and a unique identifier for the specific component or specification.

In one or more embodiments of the invention, the specification standard (108) includes one or more of a domain specification standard (118), a service specification standard (120), a presentation specification standard (122), a binding specification standard (124), as well as standards for other possible specifications (126). Each of the exemplary specification standards are described below.

A domain specification standard (118) creates a standard format for creating a domain specification (not shown). A domain specification corresponds to a set of software product elements that have a common theme. The data which each element represents is product dependent. In one or more embodiments of the invention, each element may include a description of the content to be stored in the element. The description may include a definition, type, and format. A definition corresponds to a user-defined description of the element. A type corresponds to an abstract type for the data. A format corresponds to a format used to present the data. In addition to the aforementioned description, an element may also include other descriptions, such as a name, label, default value, size requirements to store the data, etc. For example, if an element represents the first name of a person, then the definition may correspond to "first name of a person," the type may correspond to "Name," and the format may correspond to "Name type."

In one or more embodiments of the invention, a domain specification may include primitive elements (not shown), object elements (not shown), relational elements (not shown), topic elements (not shown), and catalog elements (not shown). A primitive element corresponds to an indivisible element in accordance with one or more embodiments of the invention. Specifically, a primitive element corresponds to an element by which other elements may be created. In contrast, an object element corresponds to a collection of primitive elements. In particular, an object element corresponds to a group of primitive elements. For example, if a person's first name and a person's last name are primitive elements, then person may be an object element that includes the person's first name and the person's last name.

A relational element may be used to describe the relationship between primitive elements within an object and to relationships between objects. In addition to describing the relationships, a relational element may also extend the description of primitive element. For example, a relational element may also modify a value for the description of the content or add to the description of the content of a primitive element.

A topic element corresponds to a categorization of related object elements. In one or more embodiments of the invention, the topic element creates a hierarchical categorization of the object elements. A topic element may include references to one or more object elements throughout the domain specification regardless of whether the object element is in the topic, references to relationship elements, search criteria, description of a transformation to obtain data in the topic element. A catalog element describes a relationship between topics. Specifically, a catalog element may be used to organize topics into groups.

The following is an example to illustrate a possible relationship between the different types of elements. In the example, a primitive element representing the last name of a person and a primitive element representing the first name of a person may be created. The two aforementioned primitive elements may be used in an object element representing a person. A topic element may represent a policy with subtopics of claims. In the example, relationship elements may be used to describe that the policy is owned by a member, a member is an object element of a person, and a person generates claims.

Returning to the specification standards, a service specification standard (120) describes how a service specification (not shown) is created. A service specification corresponds to a description of operations that are supported by an application. For example, a service specification may include process flows, business logic, entitlements, activities, rules, exception policies, and endpoints. A service specification may include a reference to a domain specification and/or a rule specification (described below).

A presentation specification standard (122) describes a standard for a presentation specification (not shown). A presentation specification corresponds to a description of how a user may interact with an application. For example, a presentation specification may include a description of a set of controls, resources and layouts for a feature, application, or software product. The set of controls may correspond to a mechanism for accessing functionality provided by the application. The set of resource may correspond to help files, menu descriptions. The set of layouts may correspond to a description of how the user may traverse through the application or software product.

A binding specification standard (124) describes a standard for creating a binding specification. A binding specification corresponds to a mapping between a presentation specification and service specifications.

In addition to the aforementioned specification standards, other specification standards (126) may also exist that describe other specifications. For example, specifications may exist to describe a product line, give an overview of an application, describe a use case for the application, provide requirements for the application, identify a quality level, a deployment model, and testing model, specify input and output parameters, etc. Such specifications may be user-specific and/or generic to all users.

Continuing with the description of the standards (102) of FIG. 1, the product development environment (100) may also include an API standard (110), a registry standard (112), a benchmarking standard (114), and lifecycle standard (116), as mentioned above. API standard (110) defines how applications developed using the product development environment (100) may communicate with other applications developed using the product development environment (100). In one or more embodiments of the invention, the API standard (110) specifies that each application implements an operation called get topic data. In one or more embodiments of the invention, get topic data accepts a request for a topic and search criteria for the topic and returns the requested data. In one or more embodiments of the invention, the requested data is organized in a hierarchy defined by the topic. In one or more embodiments of the invention, the API for an application may be described in a service specification (discussed above). The registry standard (112) specifies the maintenance of metadata of specifications. The metadata may be used by developers to identify other applications and software products. The benchmarking standard (114) corresponds to a standard for measuring the success of an application. The lifecycle standard (116) corresponds to a standard for maintaining an application through versioning, rules for versioning, describing the versions, etc.

Continuing with FIG. 1, a product development environment may also include a product development environment interface (104). A product development environment interface (104) corresponds to a mechanism to assist a developer to comply with the standards. Specifically, the product development environment interface may correspond to a collection of templates, an application, such as a developer tool, etc. For example, the product development environment interface (104) may be a word processing application, an XML editor, or other type of application.

Using the program development environment shown in FIG. 1 and described above, the migration of features in a software product or product line may be achieved. FIG. 2 shows a schematic diagram of a system for feature migration in accordance with one or more embodiments of the invention.

In particular, FIG. 2 shows specifications for two applications that may be generated in the product development environment described above and shown in FIG. 1. As shown in FIG. 2, the system includes application 1 profile (150), application 1 (152), application 2 profile (154), a code generator (156), and application 2 (158) in accordance with one or more embodiments of the invention.

An application 1 profile (150) corresponds to a collection of specifications (e.g., domain specification (160), service specification (162), presentation specification (164), binding specification (166), other specifications (168), feature specification (170)) that may be used to define application 1 (152). Specifically, the specifications (e.g., domain specification (160), service specification (162), presentation specification (164), binding specification (166), other specifications (168)) may correspond to the specifications described above and shown in FIG. 1. More specifically, the specifications used to define application correspond to only the specifications that are required to define an application (described in FIG. 1). Thus, for example, if application 1 corresponds to a backend application, then no presentation specification (164) would exist for application 1 (152).

In one or more embodiments of the invention, an application profile (e.g., application 1 profile (150), application 2 profile (154)) corresponds to a profile specification. A profile specification corresponds to a collection of references to specifications (e.g., domain specification (160), service specification (162), presentation specification (164), binding specification (166), other specifications (168), feature specification (170)) used to define the application. For example, the profile specification may include pointers, such as a file name or the identifiers described above and shown in FIG. 1, to the specifications.

One or more of the specifications may include a feature element (172a-172e). A feature element (172a-172e) corresponds to a description of a feature with respect to the specification that defines the feature element. For example, a feature element a (172a) in the domain specification (160) may be used to describe elements of the feature and the relationship of the feature with other elements. Similarly, a feature element b (172b) in the service specification (162) may correspond to a description of operations that are related to the feature (e.g., how the feature is used in the application).

A feature element c (172c) in the presentation specification (164) may describe how the feature is presented to a user. A feature element d (172d) in the binding specification (166) may be used to describe a relationship between a feature element (172b) in the service specification (162) and a feature element (172c) in the presentation specification (164).

In addition or as an alternative to feature elements (172a-172d) described in the specifications above, other feature elements (e.g., feature element e (172e)) may exist in other specifications. For example, a feature element may exist in a requirements specification. In one or more embodiments of the invention, feature elements (172a-172e) exist only in the relevant specifications for the feature. For example, a presentation specification (164) may exist which does not have a feature element c (172c) for the feature.

In addition to the specifications described above and in FIG. 1, in one or more embodiments of the invention, the application 1 profile (150) also includes a feature specification (170). A feature specification (170) corresponds to a conceptual entity that groups feature elements (172a-172e) for a specific feature of a software product. Additionally, a feature specification (170) may correspond to a data structure that includes references to feature elements (172a-172e) for a feature. For example, the feature specification (170) may include the identifiers for the feature elements (172a-172e). Further, the feature specification (170) may also include a description in which the feature elements (172a-172e) for the feature may be found. In addition to the feature elements (172a-172e) in application 1 profile (150), a feature specification (170) may also reference feature elements in other application profiles (not shown).

The feature specification (170) in application 1 profile (150) may be used by application 2 profile (154). In a similar fashion as the Application 1 profile (150), Application 2 profile (154) corresponds to a collection of specifications (e.g., domain specification (174), service specification (176), presentation specification (178), binding specification (180), and other specifications (182)) used to specify application 2 (158).

In one or more embodiments of the invention, application 2 profile (154) supports importing the feature specification into application 2 (158). Specifically, application 2 profile (154) may include one or more direct or indirect references to the feature specification or feature elements. Alternatively, application 2 profile (154) may include copies of the feature elements and the feature specification. While not explicitly shown in FIG. 2, application 2 profile (154) may also include one or more feature specifications.

Application 2 (158) may be generated using a code generator (156) in accordance with one or more embodiments of the invention. The code generator (156) may correspond to a program which includes functionality to automatically generate code for application 2 (158). Alternatively, a code generator (156) may corresponds to one or more application architects, developers, and/or using an application to generate code. A code generator (156) includes functionality to generate code for the application from application 2 profile (154). Specifically, a code generator (156) includes functionality to traverse one or more specifications that define application 2 (158) and generate code from the specifications. Further, the code generator (156) may also include functionality to obtain the feature elements from application 1 profile (150) when application 2 profile (154) references the feature defined in application 1 profile (150).

Figure 3:
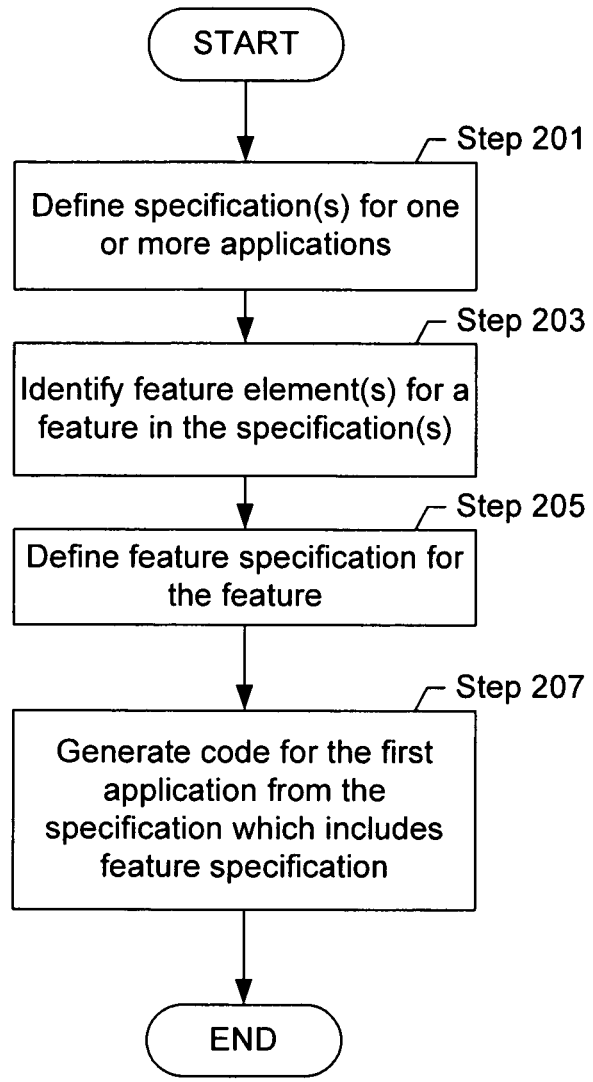
FIGS. 3-4 show a flowchart of a method for feature migration in accordance with one or more embodiments of the invention.
Figure 4:
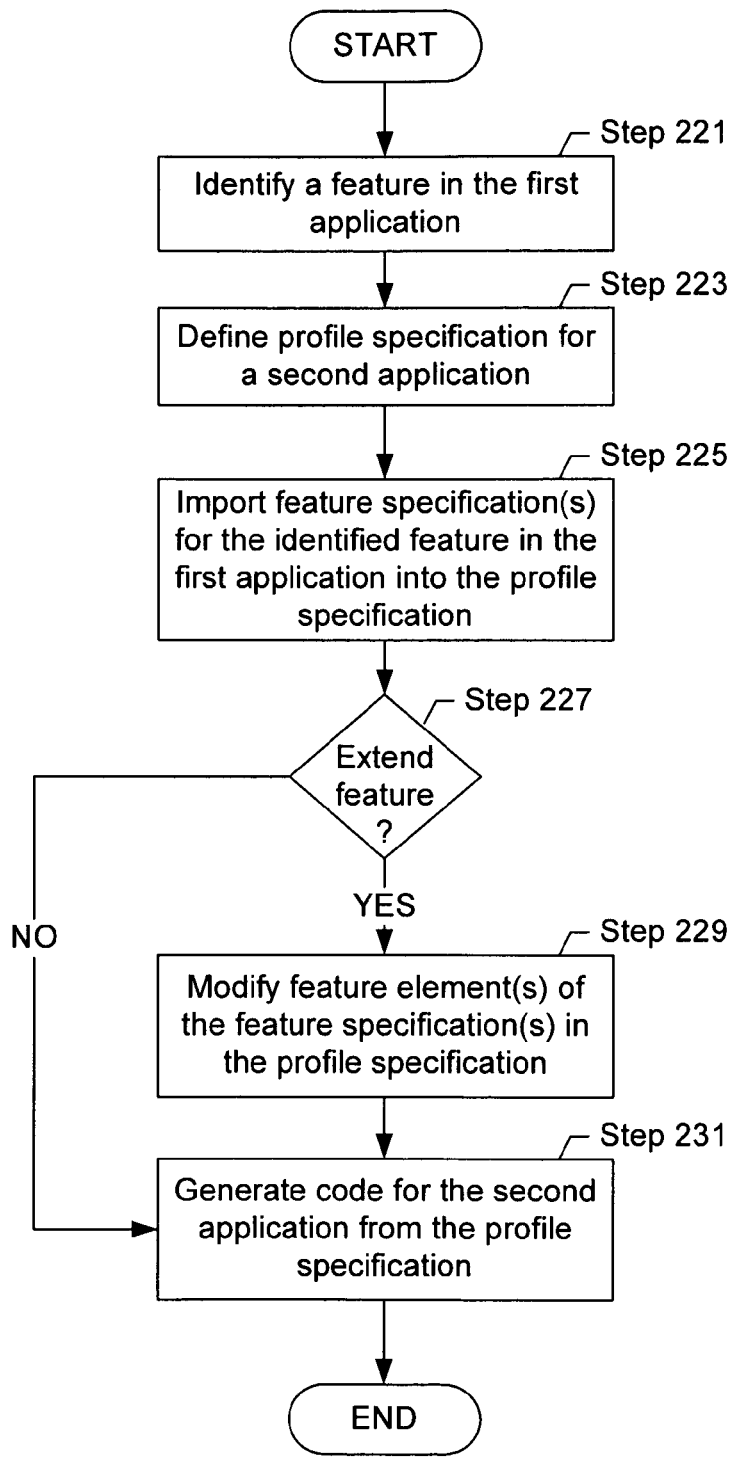

FIGS. 3-4 show flowcharts of a method for feature migration in accordance with one or more embodiments of the invention. Specifically, FIG. 3 shows a flowchart of a method for generating an application from which to import a feature element. Initially, specifications for a first application(s) are defined (Step 201) in accordance with one or more embodiments of the invention. Specifically, defining the specifications may result, for example, from performing market research to identify a set of requirements. The requirements may be translated into elements, functions that act on the elements, user interfaces for accessing the functions, etc. Alternatively, specifications may be defined using a preexisting application. If a feature is imported from multiple applications, than the specifications for the multiple applications may be defined in accordance with one or more embodiments of the invention.

During or after creating the specifications, feature elements for a feature in the specification(s) may be identified (Step 203). Identifying the feature elements may be performed using the identifier of the feature elements. For example, a developer or product development environment interface may iterate through the specifications and identify feature elements.

While or after identifying the feature elements, a feature specification is defined for the feature elements (Step 205). Specifically, references to the feature elements may be added to the feature specification. In one or more embodiments of the invention, Steps 201-205 may be dynamically performed by a product development environment interface while the specifications are created. In particular, when a new element of a specification is created, a determination is made whether the new element is a feature element of a feature. Determining whether an element is a feature element may be performed by accessing the identifier of the element. Specifically, in one or more embodiments of the invention, the identifier of an element specifies a classification for the element.

Thus, a feature element may be identified as a feature element using the identifier. If the new element is a feature element, then the product development interface may determine the feature having the feature element based on an identifier of the feature element. Accordingly, a reference to the feature element may be added to the feature specification. Further, a developer may reference other feature elements in the feature specification using a feature migration technique described below.

Based on the specifications, code for the first application may be generated from the specifications (Step 207). Generating code may be performed by a code generator iterating through the specifications or by a product development team independently creating the application. To perform feature migration, generating code from the first application is optional. Moreover, as discussed above, the specifications may be generated from the code using a form of reverse engineering known to those skilled in the art.

FIG. 4 shows a flowchart of a method for feature migration to a second application in accordance with one or more embodiments of the invention. Initially, a feature in the first application is identified (Step 221). The feature may span multiple applications. A developer or customer of the second application may identify a feature in the first application. For example, while specifying requirements for the second application, a customer may state that a particular functionality found in the first application is desired for the second application. In another example, while reviewing requirements or while determining the features that should be included in the second application, a developer may desire to use the feature in the second application. The developer may determine whether the feature is available for migration using the registry, which has metadata from the specifications (as described above).

Further, a profile specification for the second application is defined (Step 223). Defining the profile specification may be performed by defining the specifications as described in Step 201 of FIG. 3. After or while defining the specifications, a profile specification may be generated that references the specifications. For example, the profile specification may include the identifiers of the generated specifications for the application.

While creating the profile specification, a feature specification from the first application is imported into the profile specification (Step 225). Several mechanisms exist for importing the feature specification.

The following description provides only a few of the possible mechanisms for importing the feature specification. One mechanism is to copy the feature specification and the feature elements referenced by the feature specification. For example, feature elements denoted by the feature specification in the presentation specification of the first application may be copied into a presentation specification of the second application. While copying the feature elements, identifiers for the feature elements may be changed and the feature specification may be updated to reflect the new feature elements. In such a scenario, metadata associated with the feature specification of the first application may be updated to specify that the feature specification is copied to the second application. Thus, if desired, modifications to the feature specification and deletions of the feature specification may be propagated to the second application.

Another mechanism for importing the feature specification is to reference the feature specification in the profile specification of the second application. Specifically, in a manner similar to the profile specification of the second application tracking the specifications dedicated to the second application, the profile specification may also reference the feature specification of the first application. Further, in such scenario, metadata associated with the feature specification of the first application may be updated to specify that the feature specification is referred to outside of the application. Thus, if desired, modifications to the feature specification and deletions of the feature specification may not be propagated to the second application.

In addition to two aforementioned mechanisms for importing the feature specification, another mechanism may involve copying only the feature specification into the second application. Specifically, the feature specification in the second application may reference feature elements in the first application. Alternatively, the feature specification in the second application may reference feature elements in the second application. Subsequently, the feature elements in the second application may references corresponding feature elements in the first application.

If the feature spans multiple applications, than at this stage, multiple feature specifications may be imported. Further, the importation of multiple feature specifications may be performed intelligently. Specifically, feature elements that are common across the multiple feature specifications, may be imported only once rather than for each instance in the feature specifications.

Additionally, a determination is made whether to extend the feature (Step 227). Specifically, a developer may determine whether to add/modify/or remove one or more feature elements from the first application (s) when importing the feature into the new application.

If the feature is to be extended, then feature elements are modified in the feature specification(s) of the second application (Step 229). Modifying feature elements may be performed depending on how the feature specification(s) is imported into the second application.

For example, if the feature specification and feature elements are copied into the second application, then the feature elements may be modified directly in the corresponding specifications of the second application. Modifying the feature elements may be performed in a manner similar to creating the feature elements. In another example, if the feature specification is referenced in the profile specification, than the feature specification may be copied into the profile specification, and feature elements may be modified.

Alternatively, if the feature specification is copied into the profile specification, then the feature elements that are desired to be modified may also be copied and modified into the corresponding specifications of the second application. Further, feature elements that are removed from the second application, may have the reference removed in the feature specification of the second application.

In another alternative, if the feature specification of the second application references feature elements in the second application and if the feature elements of the second application reference feature elements in the first application, then the feature elements may be modified by changing the definitions of the feature elements. For example, if the feature elements are defined using XML, then additional tags may be added to the feature element to overwrite, add to, or delete existing tags.

Once the feature specification is imported and any modifications performed, then code for the second application is generated (Step 231). Generating code for the second application may be performed as described above in Step 207 of FIG. 3 for generating code in the first application. In order to generate code for the feature, the references existing in the profile specification of the second application may be used.

In one or more embodiments of the invention, the generated code corresponds to source code for the software application or product. Thus, after generating the code, the code may be compiled and an executable may be created from the code to create the second software application or product. In an alternative, the generated code may correspond to code in an interpreter. In such scenario, the generated code may correspond to the software application itself.

In the following example, consider the scenario in which the second application is a home inventory product. The home inventory product may include an application to enable a customer to photograph belongings, track insurance, and perform other such home inventory functions.

When creating the home inventory product, various features of the application are all defined in specifications that are referenced by the profile specification of the home inventory product. For example, a domain specification might explain the types of data, such as homes, inventory items, insurance policies, etc., that are used by the home inventory product. A user interface (UI) specification might describe the look and feel of the application to the user. The service and binding specifications may indicate the types of services and interactions are used by the home inventory product.

Continuing with the example, after generating the code for the application, the application is tested with beta customers. Eventually, a response is received which questions, "What happens to the inventory information if your home computer is damaged or destroyed?" In such scenario, a developer may determine that an online backup feature may be the solution to the question.

Consider the scenario, in the example, in which an online backup feature exists for another application. In such scenario, the functionality of the online backup feature may be used for the home inventory product. Specifically, in one or more embodiments of the invention, only the domain specification of the home inventory application is updated to include online backup data. Further, the binding specification may be updated to reference the existing specification in the other application that already includes the online backup feature. Finally, the profile specification may be updated and the code regenerated. In the process of regenerating the code, the online backup feature may be generated with the code.

Figure 5:
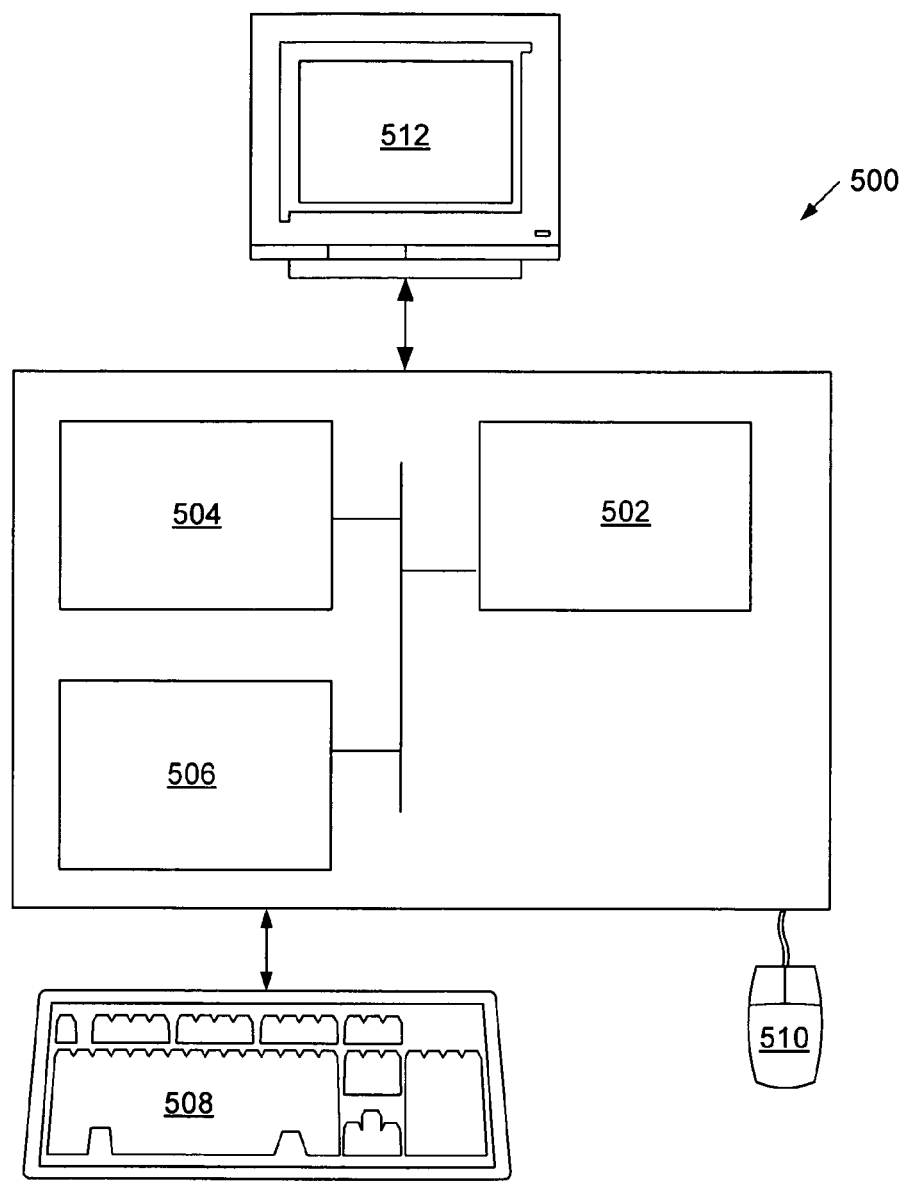
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., product development environment interface, specifications, code generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for feature migration comprising:
   defining a first specification of a first application by:
   defining a first service specification describing a plurality of operations supported by the first application, wherein the first service specification comprises a first feature element describing a first operation of the plurality of operations, and wherein the first service specification fails to describe a second operation of the plurality of operations;
   defining a first presentation specification describing a user interaction with the first application, wherein the first presentation specification comprises a second feature element defining a first user interface component having a set of controls, resources, and layouts for accessing functionality of the first operation based on user input of a user,
   wherein the set of controls, resources, and layouts are independent of the user input, and
   wherein the second feature element fails to define any user interface component associated with the second operation;
   defining a first binding specification describing a mapping between the first presentation specification and the first service specification, wherein the first binding specification comprises a third feature element, wherein the third feature element groups the first feature element and the second feature element; and
   defining a feature specification of a feature in the first application, wherein the feature specification comprises references to the first feature element, the second feature element, and the third feature element;
   generating, using a computer processor, first code for the first application based on the first specification;
   defining a profile specification of a second application;
   importing, using the computer processor, the feature specification of the feature into the profile specification, wherein importing the feature specification imports, into the profile specification, the first feature element describing the first operation, the second feature element defining the first user interface component, and the third feature element grouping the first feature element and the second feature element; and
   generating second code for the second application using the profile specification to implement a second user interface component based on the first user interface component,
   wherein the feature is incorporated in the second application to support the first operation,
   wherein the user accesses, within the second application, functionality of the first operation using the second user interface component, and wherein the feature fails to support the second operation in the second application.

2. The method of claim 1, wherein the profile specification of the second application comprises a second service specification, a second presentation specification, and a second binding specification, and wherein importing the feature specification comprises copying the first feature element into the second service specification, the second feature element into the second presentation specification, and the third feature element into the second binding specification.

3. The method of claim 1, wherein importing the feature specification comprises referencing the feature specification in the profile specification.

4. A system for feature migration comprising:
   a computer processor;
   a product development environment interface configured to execute on the computer processor and configured to:
   define a first specification of a first application by:
   defining a first service specification describing a plurality of operations supported by the first application, wherein the first service specification comprises a first feature element describing a first operation of the plurality of operations, and
   wherein the first service specification fails to describe a second operation of the plurality of operations;
   defining a first presentation specification describing a user interaction with the first application,
   wherein the first presentation specification comprises a second feature element defining a first user interface component having a set of controls, resources, and layouts for accessing functionality of the first operation based on user input of a user,
   wherein the set of controls, resources, and layouts are independent of the user input, and
   wherein the second feature element fails to define any user interface component associated with the second operation;
   defining a first binding specification describing a mapping between the first presentation specification and the first service specification, wherein the first binding specification comprises a third feature element, wherein the third feature element groups the first feature element and the second feature element; and
   defining a feature specification of a feature in the first application, wherein the feature specification comprises references to the first feature element, the second feature element, and the third feature element; define a profile specification of a second application; and import the feature specification of the feature into the profile specification,
   wherein importing the feature specification imports, into the profile specification, the first feature element describing the first operation, the second feature element defining the first user interface component, and the third feature element grouping the first feature element and the second feature element; and
   a code generator configured to execute on the computer processor and configured to:
   generate first code for the first application based on the first specification; and generate second code for the second application using the profile specification to implement a second user interface component based on the first user interface component,
   wherein the feature is incorporated in the second application to support the first operation, wherein the user accesses, within the second application, functionality of the first operation using the second user interface component, and wherein the feature fails to support the second operation in the second application.

5. The system of claim 4, wherein the profile specification of the second application comprises a second service specification, a second presentation specification, and a second binding specification, and wherein importing the feature specification comprises copying the first feature element into the second service specification, the second feature element into the second presentation specification, and the third feature element into the second binding specification.

6. The system of claim 4, wherein importing the feature specification comprises referencing the feature specification in the profile specification.

7. A non-transitory computer readable storage device comprising computer readable program code embodied therein for causing a computer system to:

define a first specification of a first application by:

defining a first service specification describing a plurality of operations supported by the first application, wherein the first service specification comprises a first feature element describing a first operation of the plurality of operations, and wherein the first service specification fails to describe a second operation of the plurality of operations;

defining a first presentation specification describing a user interaction with the first application, wherein the first presentation specification comprises a second feature element defining a first user interface component having a set of controls, resources, and layouts for accessing functionality of the first operation based on user input of a user, wherein the set of controls, resources, and layouts are independent of the user input, and wherein the second feature element fails to define any user interface component associated with the second operation;

defining a first binding specification describing a mapping between the first presentation specification and the first service specification, wherein the first binding specification comprises a third feature element, wherein the third feature element groups the first feature element and the second feature element; and defining a feature specification of a feature in the first application, wherein the feature specification comprises references to the first feature element, the second feature element, and the third feature element;

define a profile specification of a second application; and import the feature specification of the feature into the profile specification, wherein importing the feature specification imports, into the profile specification, the first feature element describing the first operation, the second feature element defining the first user interface component, and the third feature element grouping the first feature element and the second feature element, wherein first code is generated for the first application based on the first specification, wherein second code is generated for the second application using the profile specification to implement a second user interface component based on the first user interface component, wherein the feature is incorporated in the second application to support the first operation, wherein the user accesses, within the second application, functionality of the first operation using the second user interface component, and wherein the feature fails to support the second operation in the second application.

8. The non-transitory computer readable storage device of claim 7, wherein the profile specification of the second application comprises a second service specification, a second presentation specification, and a second binding specification, and wherein importing the feature specification comprises copying the first feature element into the second service specification, the second feature element into the second presentation specification, and the third feature element into the second binding specification.

9. The non-transitory computer readable storage device of claim 7, wherein importing the feature specification comprises referencing the feature specification in the profile specification.

* * * * *